United States Patent [19]

Imai et al.

[11] Patent Number: 5,276,821
[45] Date of Patent: Jan. 4, 1994

[54] OPERATION ASSIGNMENT METHOD AND APPARATUS THEREFOR

[75] Inventors: Toru Imai, Kawasaki; Takeshi Aikawa, Chofu; Mitsuo Saito, Yokosuka; Kenji Minagawa, Urayasu, all of Japan

[73] Assignee: Kabushiki Kaisha Toshiba, Kawasaki, Japan

[21] Appl. No.: 579,958

[22] Filed: Sep. 10, 1990

[30] Foreign Application Priority Data

Nov. 10, 1989 [JP] Japan ................................ 1-291205

[51] Int. Cl.⁵ ........................... G06F 9/38; G06F 9/45
[52] U.S. Cl. .................................. 395/375; 395/700; 395/775; 395/800; 364/DIG. 1; 364/231.8; 364/280.5; 364/281.3; 364/281.6; 364/281.8
[58] Field of Search ............ 364/DIG.; 395/200, 325, 395/375, 650, 700, 725, 775, 800

[56] References Cited

U.S. PATENT DOCUMENTS

| | | | |
|---|---|---|---|
| 3,643,227 | 2/1972 | Smith et al. | 395/650 |
| 3,648,252 | 3/1972 | Thron et al. | 395/650 |
| 3,648,253 | 3/1972 | Mullery et al. | 395/650 |
| 3,916,383 | 10/1975 | Malcolm | 395/650 |
| 4,073,005 | 2/1978 | Parkin | 395/650 |
| 4,318,173 | 3/1982 | Freedman et al. | 395/650 |
| 4,394,727 | 7/1983 | Hoffman et al. | 395/650 |
| 4,412,281 | 10/1983 | Works | 395/650 |
| 4,853,844 | 8/1989 | Kono | 395/650 |
| 4,937,777 | 6/1990 | Flood et al. | 395/700 |
| 5,115,511 | 5/1992 | Nilsson et al. | 395/800 |

OTHER PUBLICATIONS

"Bulldog: A compiler for VLIW Architectures", John R. Ellis, The MIT Press, 1986, Chapter 7, pp. 158-161.
Proceedings Second International Conference on Architectural Support for Programming Languages and Operating Systems, Oct. 5, 1987, pp. 180-192, Robert P. Colwell, et al., "A VLIW Architecture For a Trace Scheduling Compiler".
IEEE Transactions On Computers, vol. C-30, No. 7, Jul. 1981, pp. 478-490, Joseph A. Fisher, et al., "Trace Scheduling: A Technique for Global Microcode Compaction".
IEEE Transactions On Computers, vol. C-30, No. 7, Jul. 1981, pp. 460-477, Scott Davidson, et al., "Some Experiments in Local Microcode Compaction for Horizontal Machines".

*Primary Examiner*—Paul V. Kulik
*Assistant Examiner*—John C. Loomis
*Attorney, Agent, or Firm*—Oblon, Spivak, McClelland, Maier & Neustadt

[57] ABSTRACT

According to an assigning method and its apparatus having a resource use recording section for recording a use state of a resource necessary for executing given operations, a functional unit possession recording section for recording information representing an inexecution functional unit, and an operator information management section for storing an operation executable by each functional unit and a clock count necessary for executing the operation, in order to assign an operation selected from the operations (by the operation selection step) to an optimal functional unit, the use state of the resource is checked from the resource use recording section (with reference to the usable resource decision step), the operation executable functional unit is found from the operation unit possession recording section (by the operation assignable unit decision step). A clock count necessary for executing the operation in the executable functional unit is considered with reference to the operator information management section. The optimal functional unit to be assigned with the selected operation is selected and decided (finally by the functional unit selection step), thereby performing an effective operation assigning process.

9 Claims, 6 Drawing Sheets

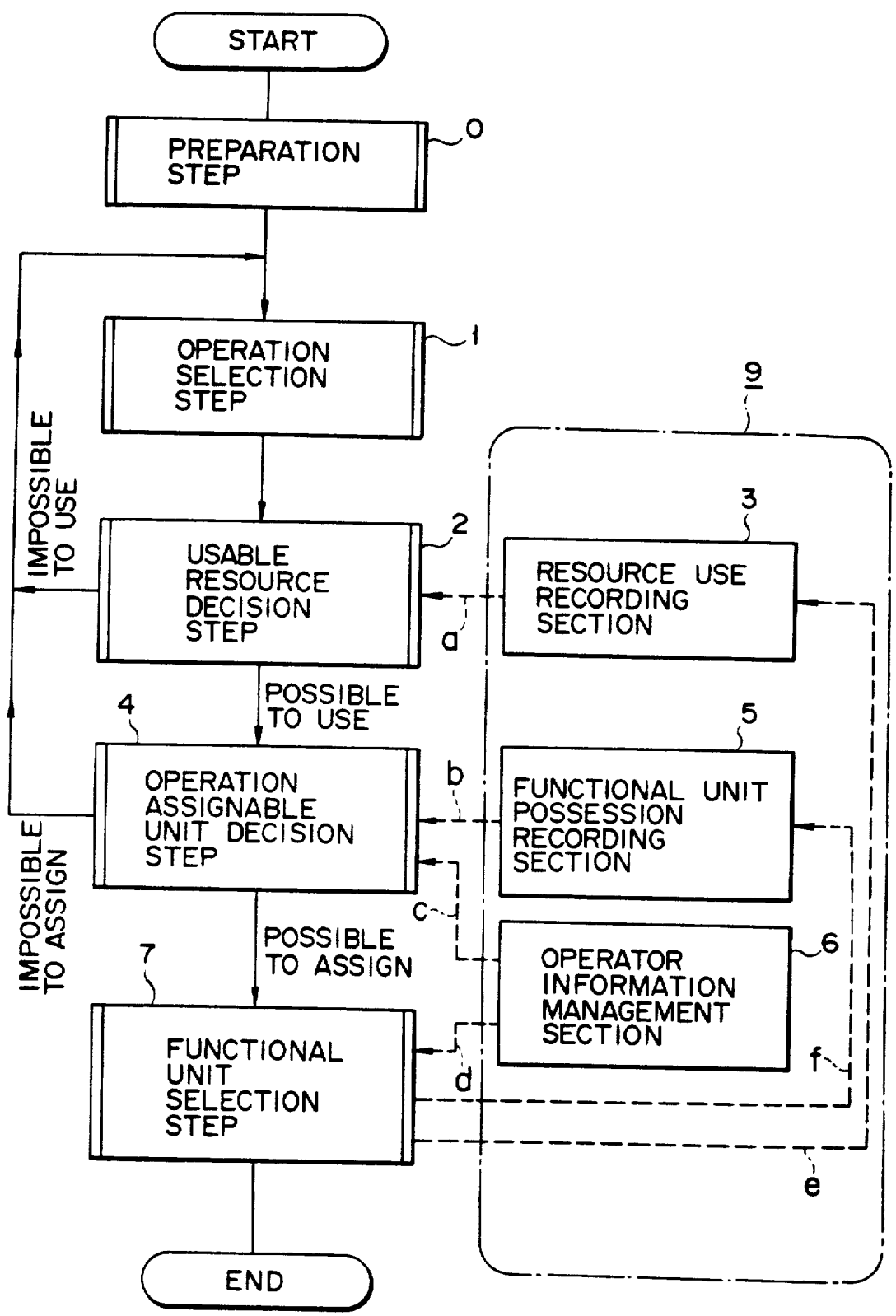
F I G. 1

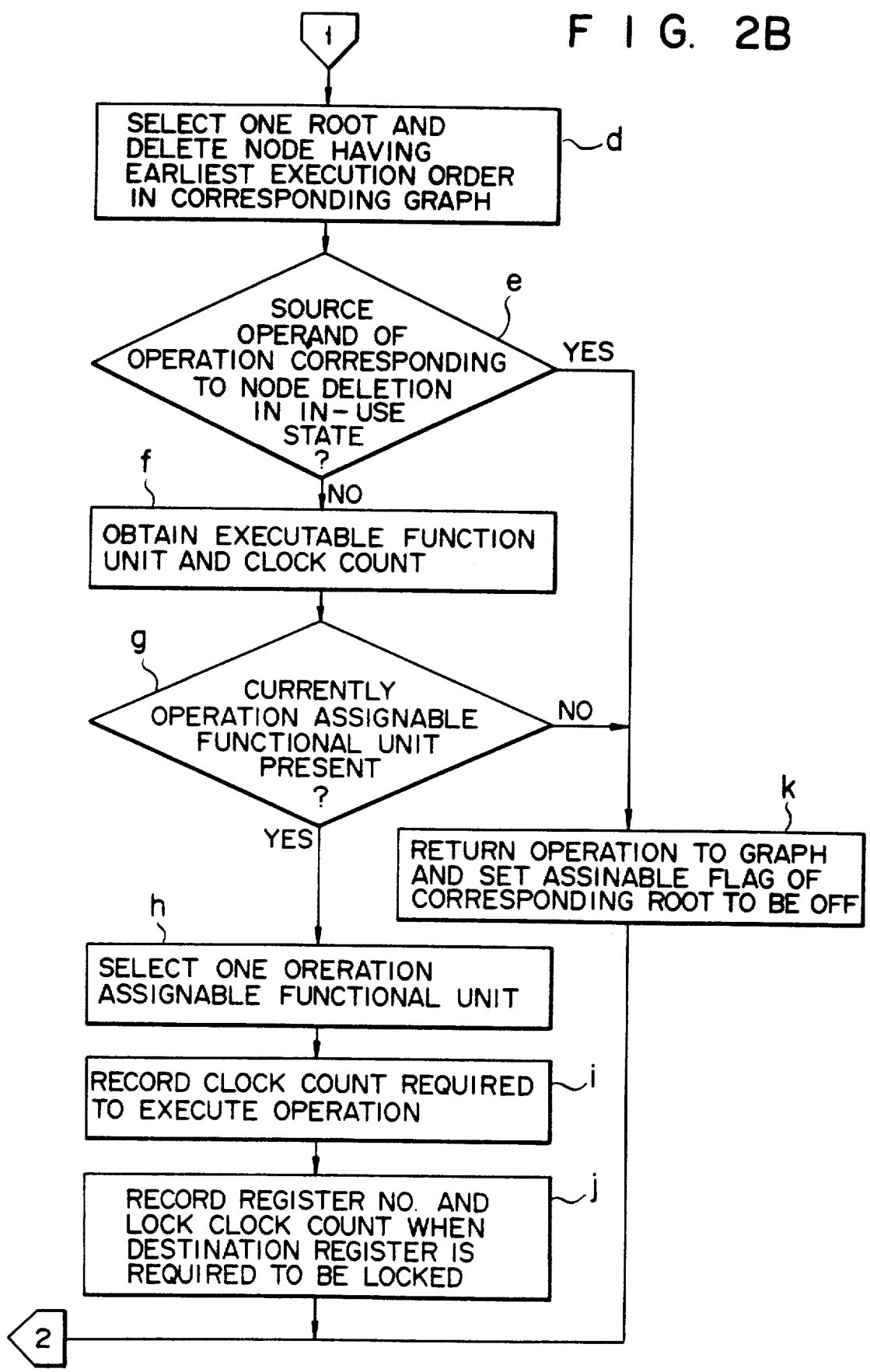

```
① lea  r1, _var
② ld   r2, r1, 0
③ ld   r3, fp-4
④ mul  r4, r2, r3
⑤ ldi  r0, 1
⑥ add  r4, r0, r4
```
FIG. 3
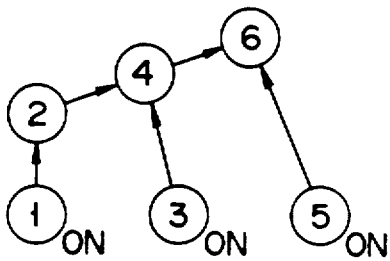
FIG. 4A
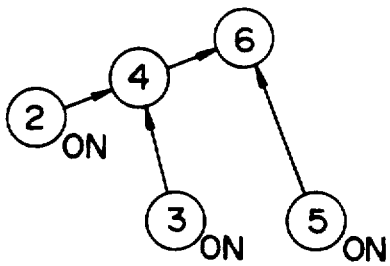
FIG. 4B
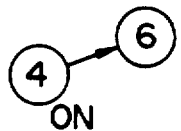
FIG. 4C
| OPER-ATION | REQUIRED CLOCK COUNT | | EXCLUSIVELY USED RESOURCE AND ITS CLOCK COUNT |
|---|---|---|---|
| | ALU1 | ALU2 | |
| add | 1 | 1 | NO |
| ld | 1 | 1 | DESTINATION REGISTER, 2 CLOCKS |
| ldi | 1 | 1 | NO |
| lea | 1 | 1 | NO |
| mul | 3 | 3 | DESTINATION REGISTER, 3 CLOCKS |
FIG. 5

| ALU1 | ALU2 |
|---|---|
| lea r1, _var | ld r3, fp, -4 |
| ld r2, r1, 0 | ldi r0, 1 |
| mul r4, r2, r3 | nop |
| nop | nop |
| nop | nop |
| add r4, r0, r4 | nop |

FIG. 6

| OPERATION | REQUIRED CLOCK COUNT | | EXCLUSIVELY USED RESOURCE AND ITS CLOCK COUNT |
|---|---|---|---|
| | ALU1 | ALU2 | |
| fadd  (A) | 1 | 3 | NO |
| ldi   (B) | — | 1 | NO |
| fmove (C) | 1 | 1 | NO |
| fmul  (D) | 2 | 3 | NO |

FIG. 7

| ALU1 | ALU2 |
|---|---|
| A | B |
| D | C |

FIG. 8

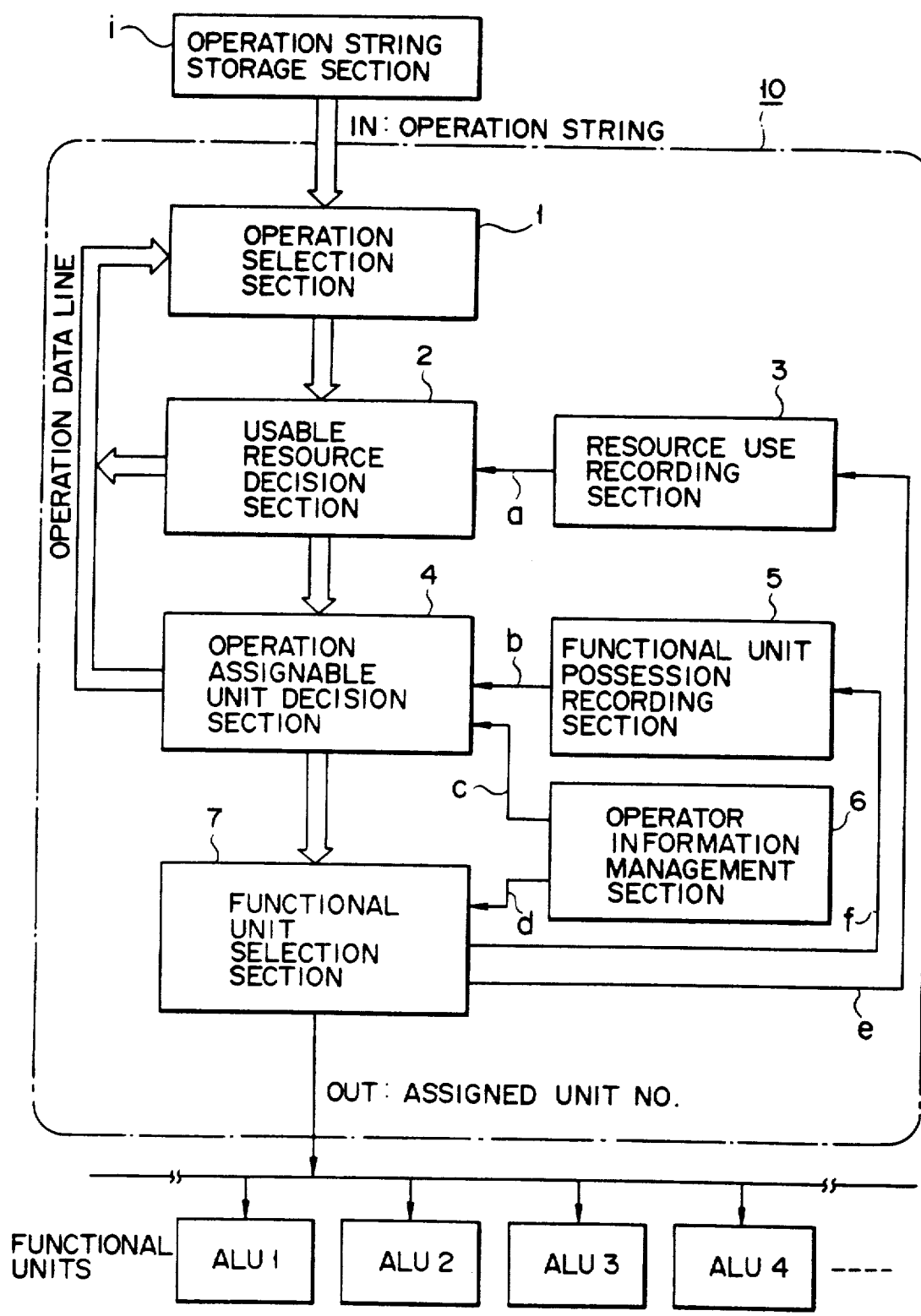
F I G. 9

OPERATION ASSIGNMENT METHOD AND APPARATUS THEREFOR

BACKGROUND OF THE INVENTION

1. Field of the Invention

The present invention relates to an operation assignment method and its apparatus using a processor having a plurality of functional units to selectively assign operations constituting an operation sequence to the functional units, thereby effectively executing the operation sequence.

2. Description of the Related Art

A technique for causing a processor having a plurality of functional units to parallelly execute the individual operations constituting an operation sequence is available as a technique for executing the operation sequence at high speed. In general, units having different functions and units having identical or equivalent functions are present in the plurality of functional units in the processor. It is, therefore, important to properly determine an assignment correspondence between each operation and each functional processor so as to processing.

The related art in which a plurality of operations are selectively assigned to a plurality of functional units and the respective operations are executed is described in the following literature in detail:

"Bulldog: A Compiler for VLIW Architectures" John R. Ellis, The MIT Press

Operations (i.e., types of operation) executable in each functional unit are limited depending on its process functions. For this reason, operations must be selectively assigned to functional units capable of executing specific operations in accordance with the types of operations. In order to selectively decide an assigning correspondence between the functional units and the operations, the types of operations and the functions of functional units must be carefully taken into consideration.

In practice, when a given operation is to be assigned to a given functional unit after consideration of such a constraint, the given unit has often been used for (or assigned to) another operation and cannot be assigned with the given operation. In this case, the assignment process of the given operation is delayed until the execution of the current operation in the given functional unit is completed, or an assignment destination of the given operation must be changed to another functional unit having an identical function.

A functional unit which executes one operation with a given clock count may execute another operation with a clock count different from the given clock count. When the assignment destination (i.e., target functional unit) of the given operation is changed, an execution process time of the given instruction may be prolonged against expectation.

When the assignment process is executed upon selection of only functional units having smaller clock counts (so-called "high speed") required to execute operations, assignment of operations is concentrated on only a specific functional unit. As a result, the assignment process speed of the operation sequence as a whole and the execution speed tend to be undesirably reduced.

It is difficult to increase an execution speed of an operation by considering only the function of each functional unit and the types of operations. Demand has arisen for realizing a method and apparatus for efficiently assigning operations.

In a conventional system for selectively assigning a plurality of operations constituting an operation sequence to a plurality of functional units and parallelly executing the operations, not only the functions of the functional units and the types of operation to be assigned to target units are taken into consideration, but also the operation assignment process must be executed while assignment conditions of the operations assigned to the plurality of functional units are taken into consideration. Therefore, an "operation assigning technique" is required to perform a (complicated) assignment process at high speed and efficiently execute the operations.

SUMMARY OF THE INVENTION

It is, therefore, an object of the present invention to provide an operation assignment method and its apparatus capable of efficiently assigning operations to a plurality of functional units for achieving high-speed execution of the operations in consideration of operation possession conditions of the functional processor serving as a resource required for operation execution.

According to an operation assignment method and its apparatus of the present invention, there are provided a resource use recording section for recording resources necessary for operation execution in units of operations, a functional unit possession recording section for recording information of a functional unit under operation execution, and an operator information management section for storing operations executable in each functional unit and clock counts required for operation execution. In selective assignment of operations selected from the operation sequence to the plurality of functional units constituting the processor, the following three procedures (1) to (3) are executed to efficiently perform the operation assignment at high speed. That is, (1) The resource use recording section is referred to check if a resource (e.g., a functional unit or a register) necessary for executing a selected operation is set in an in-use state.

(2) If the resource necessary for executing the operation is determined to be usable currently, the functional unit possession recording section and the operator information management section are referred to retrieve a functional unit which can execute this operation.

(3) Of all functional units capable of executing this operation, a functional unit capable of executing this operation is selectively determined.

More specifically, a functional unit to be selected based on a decision criterion and its conditions are given as (a) to (c):

(a) a functional unit having a smallest clock count for executing the instruction;
(b) a functional unit having a smallest clock count to execute a subsequent operation and selected from assignable functional units obtained with reference to the operator information management section; and
(c) a functional unit having a predetermined priority.

When a resource necessary for executing the operation is set in an in-use state and is determined not to execute the operation, or when any functional unit which can be assigned with the operation is not found as a result of reference, the alignment process of the functional units for the operation is interrupted, and an assignment process of another operation is started.

According to the operation assignment method of the present invention, after the use conditions of the resource required to execute an operation selected from the operation sequence are checked, a functional unit which can execute the operation is found. A clock count required for execution in a functional unit which can execute this operation and the like is taken into consideration, and an optimal functional unit to which the operation is assigned is selected and decided.

An operation assignment process for the plurality of functional units which achieve operation execution at the highest speed can be optimally and efficiently performed in accordance with the current operation assignment conditions of the plurality of functional units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a functional block flow chart schematically showing a method of the present invention;

FIGS. 2A and 2B are flow charts showing operation assignment decision process procedures according to an embodiment of the present invention;

FIG. 3 is a program list representing an operation sequence rearranged in an executable order;

FIGS. 4A, 4B and 4C are views showing a directed acyclic graph of an operation string in the list of FIG. 3;

FIG. 5 is a table showing an information content registered in an operator information management section;

FIG. 6 is a table showing an assignment result of functional units for a plurality of operations;

FIG. 7 is a table showing another information content registered in the operator information management section;

FIG. 8 is a table showing an assignment result of functional units for the operations in FIG. 7; and FIG. 9 is a schematic functional block diagram of an apparatus for realizing the method of the present invention.

DETAILED DESCRIPTION OF THE PREFERRED EMBODIMENTS

Figure 2A:
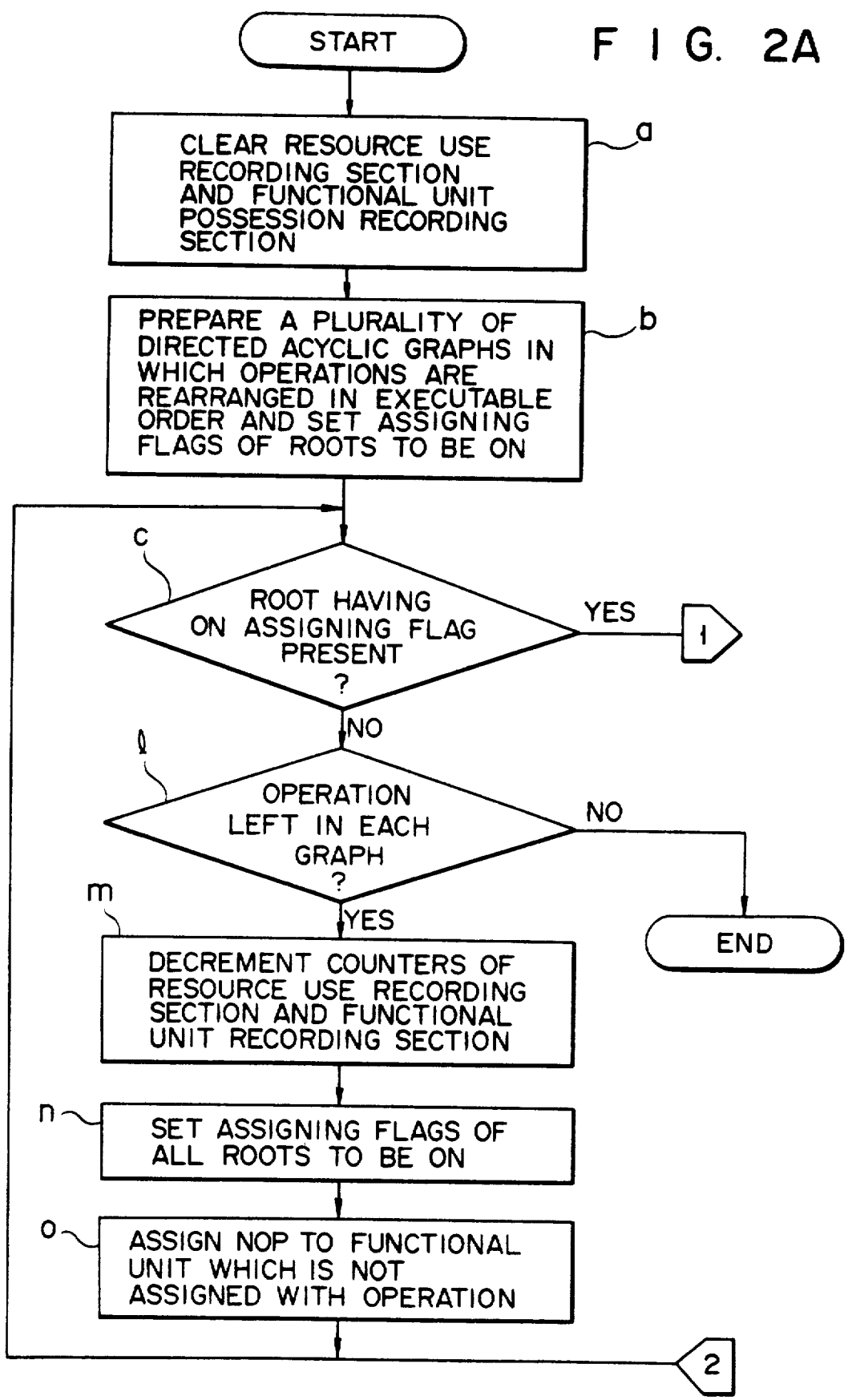

A block flow chart in FIG. 1 shows schematic process steps of an operation assignment apparatus for a plurality of functional units about an "operation assignment method". A reference relationship of data or signals in the operation assignment process is represented by broken lines.

An apparatus 9 in FIG. 1 is a recording apparatus including a resource use recording section 3, a functional unit possession recording section 5, and an operator information management section 6 (these sections will be described in detail later). The recording apparatus stores various types of information necessary for performing operation assignment.

Step 0 as the first step is a preparation step for setting the recording apparatus 9 in a predetermined initial state. This step allows execution of the subsequent process, e.g., opening of a data file, flag initialization, and allocation of various recording areas.

The next step is an operation selection step 1 for selecting operations assigned to the plurality of functional units and selected from an operation sequence. In the operation selection step 1, an operation string (i.e., a string consisting of a plurality of operation sentences) constituting an operation sequence is rearranged in an executable order, and the operations are executed in this executable order. The operations selected in this operation selection step 1 are subjected to the selection decision process of the functional units for executing the operations, i.e., operation assignment to the plurality of functional units.

In a usable resource decision step 2, whether a resource such as a register required to execute an operation selected in the operation selection step 1 is usable at the present moment is checked by referring to a resource use recording section 3 (to be described in detail later).

However, when the resource required for executing the operation selected in the operation selection step 1 is set in an in-use state and then a functional unit which can execute the operation is confirmed not to be found at present, the assignment process of the functional unit for this operation is temporarily interrupted. Instead, the assignment process for the next operation must be started. In order to start the process procedures of this operation, the flow returns to the operation selection step 1 (Case of Impossible).

To the contrary, the resource recording section 3 decides in the usable resource decision step 2 that the resource selected in the operation selection step 1 is usable at present (Case of Possible), an operation assignable unit decision step 4 is started. The operation assignable unit decision step 4 looks up a functional unit possession recording section 5 and an operator information management section 6 (both will be described in detail later) (b and c) and selects a functional unit to which the operation is assignable.

When a functional unit which is assignable with the operation is not found in the operation assignable unit decision step 4, the assignment process for assigning the operation to the functional unit is temporarily interrupted. In order to start the assignment process for the next (subsequent) operation, the flow returns to the operation selection step 1 (Case of Impossible).

When any functional unit which is assignable with the operation is found in the operation assignable unit decision step 4 (Case of Possible), this information is input to a functional unit selection step 7. The functional unit selection step 7 basically has a function of assigning the operation to the functional unit when only one function which is assignable with the operation is detected. If there are a plurality of functional units which are assignable with the operation, the operator information management section 6 is referred to selectively decide a functional unit which is to be assignable with the operation.

The resource use recording section 3 comprises a recording apparatus for storing information representing that resources such as registers included in functional units to which an operation is assigned in the functional unit selection step 7 are set in an in-use state during execution of the operation. The functional unit possession recording section 5 is a recording apparatus for recording in-use functional units to which an operation is assigned in the functional unit selection step 7. These pieces of information are sequentially erased at an end of execution of the operation. Therefore, the information representing resources which are currently usable is stored in the resource use recording unit 3. The functional unit possession recording section 5 stores information of a functional unit which is not currently usable.

The operator information management section 6 comprises a memory for storing types of operations executable by the plurality of functional units and information such as clock counts required for executing the operations.

Assignment of the selected operations to the plurality of functional units is executed by deciding assignable functional units in accordance with information stored in the resource use recording section 3, the functional unit possession recording section 5, and the operator information management section 6.

These recording sections (3, 5, and 6) may be tables assigned in a memory area of a main memory which stores necessary data of the method of the present invention, or direct files having a high access speed.

FIGS. 2A and 2B are flow charts showing operation assignment decision procedures for assigning to the plurality of functional units operations constituting a program executed by an apparatus which performs the above-mentioned operation, e.g., a control processor.

This assignment process is performed by the following processing procedures (a sequence constituted by a plurality of steps).

That is, the contents of the recording areas of the resource use recording section 3 and the functional unit possession recording section 5 are cleared to initialize them (step a).

Operations (i.e., operation statements or source programs) executed by the plurality of functional units are then input, and the plurality of operations in operation strings constituting the operations are given as ①) to ⑥ in FIG. 3 below (step b).

FIG. 3 shows operation strings as follows:
① lea r1,_var
② ld r2,r1,0
③ ld r3,fp,−4
④ mul r4,r2,r3
⑤ ldi r0,1
⑥ add r4,r0,r4

The first identifier of each operation described above represents an operation mnemonic, the second identifier represents a destination register (i.e., a register which stores a functional result), and the third and subsequent identifiers represent a source register, a label, and a value (numeric value).

Each operation sentence (operation statement) will be briefly described below.

The operation statement ① represents an operation for loading an address represented by label "_var" in a register r1.

The operation statement ② represents an operation for loading data having an address represented by the register r1 in a register r2.

The operation statement ③ represents an operation for loading data obtained by subtracting [4] from a value of a register fp in a register r3.

The operation statement ④ represents an operation for obtaining a product of a value of the register r2 and a value of the register r3 and loading the product in a register r4.

The operation statement ⑤ represents an operation for loading a value [1] in the register r0.

The operation statement ⑥ represents an operation for adding a value of the register r0 and a value of the register r4 and loading the sum in the register r4.

A plurality of directed acyclic graphs having relations shown in FIG. 4 are generated on the basis of the operation string rearranged in the executable order shown in FIG. 3. Assigning flags of roots of the directed acyclic graphs are set to be ON. Each operation to which an arrow is directed in each directed acyclic graph can be executed after an operation as a root of the arrow is executed operations at the roots of the arrows in the directed acyclic graphs are operations assignable at that moment. The presence of operations assignable to the functional units can be represented by assigning flags (ON/OFF) given to these roots.

After the above procedures are executed as pre-processing prior to the start of operation assignment, the operation selection step 1 is started.

The operation selection step 1 is executed to determine whether a root corresponding to the OFF assigning flag in each directed acyclic graph (i.e., an operation is assignable to a functional unit but its assignment is not completed) is present in accordance with the assigning flags (step c).

If roots whose assigning flags are ON are found, one of the roots is selected, and a node having a higher execution priority in the directed acyclic graph corresponding to the selected root is deleted (step d).

The usable resource decision step 2 is then started to determine whether a register serving as an operand source of an operation of the selected root whose node is deleted is set in an in-use state (step e). The resource use recording section 3 checks whether the source operand required to execute the selected operation is usable.

When the source operand required to execute the selected operation is usable, the operation assignable unit decision step 4 is started. The operator information management section 6 is accessed to obtain a functional unit which can execute the above operation and a clock count required for executing this operation (step f). That is, the operator information management section 6 stores predetermined information, e.g., information of functional units which can execute each operation shown in FIG. 5, a clock count required to execute the operation in this functional unit, a resource which is exclusively used during execution of this operation, and its clock count. With reference of the operation information management section 6 which stores the above pieces of information, a functional unit which can execute an operation and a clock count required to execute this operation in the corresponding functional unit are obtained.

On the basis of the above pieces of information obtained by the above processing, the functional unit possession recording section 5 is referred to select a currently usable functional unit of the functional units which can execute the operation (step g). That is, of all the operation executable functional units selected with reference to the operator information management section 6, only a true operation assignable functional unit except for functional units improper in current operation assignment is selected.

When all the functional units assignable with the operation are not selected as the above-mentioned functional unit which cannot be currently assigned with the operation due to an in-use state at present, or when it is determined that the operation cannot be executed because of an in-use state of the source operand required to execute the operation during processing of step e, this operation is returned to the corresponding directed acyclic graph, and the assigning flag assigned to the corresponding root is turned off (step k).

In order to assign remaining operations to functional units, control returns to processing procedures starting from step c.

The presence/absence of the functional unit assignable to the selected operation can be decided in the operation assignable unit decision step 4 (step g).

As a result of the above decision, at least one assignable functional unit is present (i.e., if YES), one functional unit is selected from the operation assignable functional units obtained in the functional unit selection step 7 (step h).

Decision associated with assignment of this functional unit is performed in accordance with algorithms (1) to (3) below.

(1) A functional unit having a smallest clock count required to execute this operation is selected.

(2) An assignment destination (i.e., functional unit) is decided to execute the next operation by a smaller clock count.

(3) A functional unit assigned with the operation is decided in accordance with a predetermined priority given among those functional units.

Note that selection and decision of the functional unit may be performed by an appropriate combination of these "assignment decision algorithms". Alternatively, the above algorithms may be executed in a predetermined order to select and decide a functional unit to which an operation is assigned.

When a functional unit which executes an operation is decided by the above procedures, the functional unit possession recording section 5 stores information of the selected functional unit and the clock count required to execute the operation in the selected unit (step i).

When the destination register is locked and is exclusively used by a given operation during execution of the given operation, its register number and a clock count to be locked are stored in the resource use recording section 3 (step j).

Decision for assigning the operation selected by the above procedures to the functional unit is completed by the series of processing means described above. Processing is started again from step c to determine whether roots whose assigning flags are ON are left. If a root whose assigning flag is ON is found, decision for assigning the corresponding operation to a functional unit is repeated.

As described above, when operations corresponding to all the roots having ON assigning flags are assigned to functional units, it is determined whether an operation is left in each directed acyclic graph (step l).

If no operation is left in each directed acyclic graph, a series of assignment decision processing is completed (i.e., control reaches END).

If at least one operation is left, remaining counters in the resource use recording section 3 and the operation unit possession recording section 5 are decremented by one each (step m).

The assigning flags of the remaining roots of the directed acyclic graphs are set to be ON, respectively, (step n).

Operation assignment to functional units which have not been assigned with specific operations is completed at this time, and an NOP (Nonoperation) operation is output to synchronize functional execution between functional units (step o).

Functional unit assignment about roots whose assigning flags are newly set to ON is repeatedly executed. When the above assignment of all operations to the functional units is performed, assignment of all the functional units for performing a plurality of operations constituting given operations is decided.

Processing procedures in decision for assigning operations to functional units are performed, as shown in FIG. 3. For example, operations ① to ⑥ are given in an executable order, the directed acyclic graph shown in FIG. 4A is generated first. The roots in this directed acyclic graph are determined so that operations ①, ③ and ⑤ are obtained, and the corresponding assigning flags are set to be ON.

One of the roots, e.g., the operation ① is selected, decision for assigning the operation ① to a functional unit is started. An operand source of the operation ① is checked to be [_var]. The resource use recording section 3 is cleared to an initial state. In this case, since the source operand [_var] is not registered yet, a usable state of this resource is requested. Therefore, processing in step f is started.

In this processing, the operator information management section 6 is looked up or referred. A clock count required to execute the operation [lea] in functional units [ALU1] and [ALU2] which can execute operation ① mnemonic [lea] represented by the information registered in the operator information management section 6 shown in FIG. 5 is [1]. There is no resource which is exclusively used to execute the operation ①.

Functional units assignable to the operation ① are found to be [ALU1] and [ALU2].

A functional unit to which the operation ① is actually assigned is selected. In this case, since these two functional units have identical functions and their clock counts for executing the operation are equal to each other, any one of the functional units [ALU1] and [ALU2] is selected.

When assignment of the operation ① to the functional unit which executes this operation is completed by the above procedures, information representing possession of the [ALU1] within a one-clock period is recorded in the functional unit possession recording unit. Since an exclusively used resource is not present at the time of execution of the operation [lea], nothing is recorded in the resource use recording section 3. When processing for the operation ① is completed, the directed acyclic graph is changed (updated) to the directed acyclic graph shown in FIG. 4B.

In this state, the next root ((③)) is selected. In this case, the assigning flags corresponding to roots of the operations ②, ③, and ⑤ in FIG. 4B are set to be ON.

When the operation ③ is selected as the next root, the functional unit [ALU2] is assigned to the operation [ld] represented by ③ upon execution of the same algorithms as described above. In this case, information representing the possession of the functional unit [ALU2] within a one-clock period is recorded in the functional unit possession recording section 5. At the time of execution of this operation, the destination register is exclusively used within a two-clock period. These pieces of information are obtained from the information registered in the operator information management section 6. Therefore, information of the destination register [register r2] of the operation ③ and information representing possession of this register within the 2-clock period are stored in the resource use recording section 3.

Decision for assigning the next operation to a functional unit is started again. In this case, assigning flags assigned to the roots corresponding to the operations ② and ⑤ in a directed acyclic graph (although not shown) are set to be ON. In this case, one of the operations ② and ⑤ is selected. However, even if either operation is selected, the fact that a functional unit assignable to this operation is not left is required from information recorded in the functional unit possession recording section 3. Processing in step k shown in FIG. 2 to set assigning flags assigned to the roots corresponding to the selected operations to be OFF. When the next operation is selected, no functional unit assignable to this operation is present. Therefore, the assigning flag for the root corresponding to this operation is set to be OFF. This processing is repeated to set assigning flags of all the roots to be OFF.

When the processing procedures has been performed as described above, processing is performed in steps m to o in FIG. 2 to reset the assigning flags for the above roots to be ON. Therefore, operation assignment for the next clock is started.

The operation ② is selected at this moment. Similarly, functional unit assignment decision is started. For example, the functional unit [ALU1] is assigned as a functional unit for executing this operation, and the functional unit [ALU2] is assigned as the functional unit for executing the next operation ⑤. When this decision is completed, the directed acyclic graph is modified into the graph shown in FIG. 4C. Information which represents possession of the functional units [ALU1] and [ALU2] within a one-clock period is stored in the functional unit possession recording section 5. Information of the register r1 serving as the destination register of the operation ② and information representing that this register is possessed within a two-clock period are stored in the resource use recording section 3.

Decision for assigning the operation ④ whose assigning flag is ON is started. At this time, however, since the two functional units [ALU1] and [ALU2] are set in an in-use state, the assigning flag is set to be OFF.

Processing in steps m to o in FIG. 2 is performed, and the assigning flag for the root is reset to be ON.

Decision for assigning an operation corresponding to the next clock (i.e., third clock) to a functional unit will be started. In this case, information of the register r2 serving as the destination register of the operation ③ and recorded in the resource use recording section 3 is deleted because the 2-clock operation has been completed.

When decision for assigning an operation corresponding to the third clock is started, only the root corresponding to the operation ④ is present, decided from the directed acyclic graph. The operation ④ is selected, and functional unit assignment decision is started.

The mnemonic of the operation ④ is [mul], and this operation can be executed by either the functional unit [ALU1] or the functional unit [ALU2]. For example, the functional unit [ALU1] is assigned to the operation ④. In this case, three clocks are required to execute the operation [mul], judging from the content of the operator information management section 6 in FIG. 5. Information representing possession of the functional unit [ALU1] within the 3-clock period is recorded in the functional unit possession management section 5. When the operation [mul] is executed, it is apparent that the destination register is possessed within the 3-clock period. Information of the register r4 serving as the destination register of the operation ④ and information representing possession of this register within the 3-clock period are stored in the resource use recording section 3.

Decision for assigning the remaining operation ⑥ to a functional unit is then performed. More specifically, since the register r4 serving as the source register of the operation ⑥ is set in an in-use state, judging from the information stored in the resource use recording section 3. In this clock period, it is detected to be impossible to assign the operation ⑥ to a functional unit. Decision of assigning other operations is then attempted. However, since no operations except for the operation ⑥ are present, an NOP operation is given to the functional unit [ALU2] which is not subjected to operation assignment, and processing for the next clock is performed.

Assignment of the operation ⑥ to a functional unit must be performed even in the processing procedures for the fourth clock. However, this cannot be performed due to the same reason as described above. As a result, after NOP operations are respectively supplied to the functional units [ALU1] and [ALU2], processing for the next clock is started.

It is impossible to assign the operation ⑥ to a functional unit for the fifth clock due to the same reason as described above. NOP operations are respectively supplied to the functional units [ALU1] and [ALU2] again.

Processing for the next clock is then started. In this case, information of the register r4 serving as the destination register of the operation ④ stored in the resource use recording section 3 is deleted because a 3-clock operation is completed.

When the process for the sixth clock is started, decision for assigning the operation ⑥ is detected to be possible because the information in the resource use recording section 3 has been deleted. Registration information associated with the operation mnemonic [add] of this operation ⑥ is checked with reference to the operator information management section 6. For example, the functional unit [ALU1] is assigned to the operation ⑥. This assignment information is recorded in the functional unit possession recording section 5.

After a series of processing procedures are executed, assigning processing is completed because no operation string is left.

In the above description, the two functional units [ALU1] and [ALU2] have equivalent functions.

On the other hand, a plurality of functional units having different functions will be exemplified with reference to FIG. 7. For the sake of simplicity, operations (fadd, ldi, fmove, and fmul) are represented by A, B, C, and D, respectively. As shown in FIG. 7, the following assignment decision is made for the two functional units.

That is, if it is assumed that the above four operations A, B, C, and D are not dependent on each other, assignment may be started from any one of the operations. For example, when the operation A is selected, it is apparent that the operation A can be executed by any one of the functional units [ALU1] and [ALU2], judging from the registration information in the operator information management section 6 shown in FIG. 7. In particular, when the functional unit [ALU2] is selected, it is apparent that three clocks are required to execute the operation A. In this case, in order to execute the operation A by using a smaller number of clocks, the operation A is assigned to the functional unit [ALU1].

The operation B is then checked. That is, it is found that the operation B can be assigned to only the functional unit [ALU2]. The operation B is assigned to the functional unit [ALU2]. As a result, assignment decision of the operation C for the next clock is started because there is no functional unit assignable at this clock count.

When the operation C is selected, it is found that the operation C can be executed by the functional unit [ALU1] or [ALU2]. It is also apparent that the clock count for the functional unit [ALU1] is equal to that for the functional unit [ALU2]. In this case, the operation C can be apparently assigned to either functional unit. Checking for the next operation is performed. Assignment of the operation C to one of the functional units is performed to minimize a clock count for executing the next operation D.

A clock count necessary for execution of the operation D is checked. It is apparent that execution of the operation D by the functional unit [ALU1] can reduce a clock count by one clock, judging from the information registered in the operator information management section 6. Based on the above information, the operation D is assigned to the functional unit [ALU1]. As a result, the operations assigned to the two functional units [ALU1] and [ALU2] are determined in the table of FIG. 8. Assignment can be completed to execute the operations by a smaller clock count in the entire system.

In the above embodiment, the operations are assigned to the two functional units. However, assignment of operations to three or more functional units can be performed as described above.

Even if these functional units have different functions, assignment can be similarly performed. Various changes and modifications may be made for algorithms for determining selection of a specific one of assignable functional units. A modification may be made for assignment of operations by a smaller clock count in the entire system.

Various changes and modifications may be made without departing from the spirit and scope of the invention.

FIG. 9 shows an arrangement of a main functional part of an apparatus for realizing the method of the present invention.

That is, this apparatus comprises a resource use recording section 3 for recording use states of resources required to execute operations, a functional unit possession recording section 5 for storing information representing an in-execution functional unit, and an operator information management section 6 for storing operations executable in the respective functional units and clock counts necessary for executing the operations. The sections 3, 5, and 6 are constituted by a memory made of, e.g., a RAM.

The apparatus further comprises an operation selection section 1 for selecting each operation from an operation string memory section i which stores a series of operations and for loading each selected operation in an input buffer, a resource usable decision section 2 for checking whether a resource necessary for executing the selected operation is in an in-use state with reference (a) to the resource use recording section 3, an operation assignable unit decision section 4 for obtaining a functional unit which can execute the selected operation with reference (b, c) to the functional unit possession recording section 5 and the operator information management section 6 when the resource necessary for executing the selected operation, which is selected by the usable resource decision section 2, is decided to be usable, and a functional unit selection section 7 for selecting and deciding an optimal functional unit for executing the selected operation with reference (d) to the operator information management section 6, from functional units (e.g., ALU1, ALU2, ALU3, ALU4, ...) assigned with the operation by the operation assignable unit decision section 4.

A thick arrow represents a data bus line through which operation data flows, and a thin arrow represents a signal line through which reference data or a reference signal flows.

As described above, according to the present invention, an operation is analyzed in accordance with an operation executable by a plurality of units and a clock count required to execute its operation. At the same time, each functional unit to be assigned with each operation selected from a plurality of operations is sequentially determined. Assignment of an operation string more effectively executed by a smaller clock count can be facilitated.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A method of assigning a series of executable codes to a plurality of functional units included in a processor, comprising the steps of:

preparing a resource use recording section having register means, said resource use recording section recording whether data necessary for executing one of executable codes is ready in said register means or not;

preparing a functional unit possession recording section for recording how the executable codes are allocated in said functional units;

preparing an operation information management section for storing a plurality of data pairs each of which is formed of one of the executable codes and a clock count;

checking whether data necessary for executing the selected one executable code, for every data, is ready to use or not with reference to said resource use recording section;

obtaining at least one of said functional units as one executable code assignable unit which can execute the selected one executable code with reference to said functional unit possession recording section and said operator information management section, when the data necessary for executing the selected one executable code is decided to be ready to use by the previous step; and selecting one of said functional units which executes the selected one executable code in accordance with said assignable functional unit obtained by the previous step.

2. A method according to claim 1, which includes the step of looking up said functional unit possession recording section and said operator information management section and selecting one of said functional units to which the executable code is assignable, when said resource use recording section decides that the one executable data selected from the series of executable codes is usable at present.

3. A method according to claim 1, which includes the step of temporarily interrupting the assignment of the executable code to said functional units.

4. A method according to claim 1, wherein said functional unit possession recording section registers at least one of said functional units to which the executable code is assigned.

5. A method according to claim 1, wherein said resource use recording section stores information representing the executable codes which are currently usable, and said functional unit possession recording section stores information of at least one of said functional units which is not currently usable.

6. A method according to claim 1, wherein said operator information management section comprises a memory for storing the codes executable by said plurality of functional units and data required for executing the executable codes.

7. A method according to claim 1, wherein said resource use recording section, said functional unit possession recording section, and said operation information management section comprises tables assigned in a memory area of a main memory.

8. A method according to claim 1, wherein said functional unit possession recording section checks what functional units are usable.

9. A method according to claim 1, wherein said operator information management section decides that if the executable code is allocated to which one of the functional units, the execution of the selected executable code is early completed.

* * * * *